(12) United States Patent
Deroche et al.

(10) Patent No.: US 11,153,539 B2
(45) Date of Patent: Oct. 19, 2021

(54) METHODS AND SYSTEMS TO PRE-WARP AND IMAGE

(71) Applicant: GOOGLE LLC, Mountain View, CA (US)

(72) Inventors: Isaac James Deroche, Kitchener (CA); Lai Pong Wong, Waterloo (CA); Stuart James Myron Nicholson, Waterloo (CA); Jerrold Richard Randell, Waterloo (CA); Dustin Griesdorf, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/904,788

(22) Filed: Jun. 18, 2020

(65) Prior Publication Data

US 2020/0404225 A1    Dec. 24, 2020

Related U.S. Application Data

(60) Provisional application No. 62/864,061, filed on Jun. 20, 2019.

(51) Int. Cl.
*H04N 9/31* (2006.01)
*G02B 27/01* (2006.01)

(52) U.S. Cl.
CPC ......... *H04N 9/312* (2013.01); *G02B 27/0172* (2013.01); *H04N 9/3185* (2013.01); *G02B 2027/011* (2013.01); *G02B 2027/0178* (2013.01)

(58) Field of Classification Search
CPC .. H04N 9/312; H04N 9/3185; G02B 27/0172; G02B 2027/011; G02B 2027/0178
USPC ........................................................ 348/759
See application file for complete search history.

(56) References Cited

U.S. PATENT DOCUMENTS

| | | | |
|---|---|---|---|
| 10,586,306 B2 * | 3/2020 | Noh | G06K 9/46 |
| 2004/0130669 A1 * | 7/2004 | Shin | H04N 9/31 348/744 |
| 2004/0156558 A1 * | 8/2004 | Kim | G06T 5/006 382/276 |
| 2004/0184013 A1 * | 9/2004 | Raskar | G03B 37/04 353/121 |
| 2008/0101711 A1 * | 5/2008 | Kalker | G06T 3/00 382/254 |
| 2017/0178288 A1 * | 6/2017 | Adaszewski | G06T 19/006 |
| 2017/0193687 A1 * | 7/2017 | Lo | G06T 5/006 |
| 2017/0206689 A1 * | 7/2017 | Eo | H04N 9/646 |
| 2020/0264498 A1 * | 8/2020 | De La Cruz | G03B 21/147 |

* cited by examiner

*Primary Examiner* — Michael Lee

(57) ABSTRACT

There is provided a method including obtaining an initial spatial coordinate of a pixel of an image to be projected. The method may also include generating a pre-warped spatial coordinate associated with the initial spatial coordinate. The pre-warped spatial coordinate may be calculated as a sum of a value of a warp path function at the initial spatial coordinate and a delta. Moreover, the method may include outputting the pre-warped spatial coordinate.

20 Claims, 12 Drawing Sheets

METHODS AND SYSTEMS TO PRE-WARP AND IMAGE

CROSS-REFERENCE TO RELATED APPLICATIONS

This application claims the benefit of U.S. Provisional Patent Application No. 62/864,061, filed Jun. 20, 2019, titled "Methods and Systems to Pre-Warp an Image", the content of which is incorporated herein in its entirety by reference.

FIELD

The present specification relates to methods and systems to pre-warp an image, and in particular to methods and systems to pre-warp an image to be projected.

BACKGROUND

Image projection devices may be used to display images to a viewer. Such devices may have optical elements in the optical path between the projection device's light source and the viewer. In addition, the operating characteristics of the image projection devices may affect the image being projected. These optical elements and operating characteristics may impact or warp the projected image.

SUMMARY

According to an implementation of the present specification there is provided a method comprising: obtaining an initial spatial coordinate of a pixel of an image to be projected; generating a pre-warped spatial coordinate associated with the initial spatial coordinate, the pre-warped spatial coordinate calculated as a sum of: a value of a warp path function at the initial spatial coordinate; and a delta; and outputting the pre-warped spatial coordinate.

The outputting the pre-warped spatial coordinate may comprise communicating the pre-warped spatial coordinate to an image projection device to project the pixel.

The method may further comprise: projecting the pixel using the pre-warped spatial coordinate.

The method may further comprise: obtaining the warp path function associated with an image projection device, comprising: operating the image projection device to project the pixel on a display element using the initial spatial coordinate to form a projected pixel; determining a displayed spatial coordinate of the projected pixel on the display element; determining a deviation of the displayed spatial coordinate from the initial spatial coordinate; and generating the warp path function to describe an inverse of the deviation.

The warp path function may comprise a piecewise polynomial.

The delta may be zero.

The delta may be a constant.

The delta may comprise a corresponding function of the initial spatial coordinate.

The corresponding function may comprise a corresponding piecewise polynomial.

The method may further comprise: selecting the warp path function based on one or more of: a wavelength of a light to be used to project the pixel; and a temperature of an image projection device to project the pixel.

The method may further comprise: obtaining a further initial spatial coordinate of the pixel of the image, the initial spatial coordinate and the further initial spatial coordinate to describe a position of the pixel; generating a further pre-warped spatial coordinate associated with the further initial spatial coordinate, the further pre-warped spatial coordinate calculated as a corresponding sum of: a corresponding value of a further warp path function at the further initial spatial coordinate; and a further delta; and outputting the further pre-warped spatial coordinate.

According to another implementation of the present specification there is provided a method comprising: obtaining an initial spatial coordinate of a pixel of an image to be projected, the initial spatial coordinate associated with a first temperature associated with an image projection device to project the pixel; obtaining a second temperature associated with the image projection device; generating a pre-warped spatial coordinate of the pixel associated with the initial spatial coordinate, the pre-warped spatial coordinate calculated as a sum of: the initial spatial coordinate; and a product of a temperature change and a temperature deviation function, the temperature change comprising a difference between the second temperature and the first temperature, and the temperature deviation function describing a temperature-normalized inverse change in the initial spatial coordinate as a function of change in temperature; and outputting the pre-warped spatial coordinate.

The outputting the pre-warped spatial coordinate may comprise communicating the pre-warped spatial coordinate to the image projection device to project the pixel.

The method may further comprise: projecting the pixel using the pre-warped spatial coordinate.

The method may further comprise: obtaining the temperature deviation function, comprising: operating the image projection device to project the pixel on a display element using the initial spatial coordinate at the first temperature to form a first projected pixel; determining a first displayed spatial coordinate of the first projected pixel on the display element; operating the image projection device to project the pixel on the display element using the initial spatial coordinate at the second temperature to form a second projected pixel; determining a second displayed spatial coordinate of the second projected pixel on the display element; determining a deviation of the second displayed spatial coordinate from the first displayed spatial coordinate; and generating the temperature deviation function to describe an inverse of the deviation.

According to yet another implementation of the present specification there is provided a system comprising: a light source to generate a source light; a spatial modulator to receive the source light from the light source; a display element to receive the source light from the spatial modulator and direct the source light towards an eye of a viewer; and a controller in communication with the light source and the spatial modulator. The controller is to: obtain an initial spatial coordinate of a pixel of an image to be projected; generate a pre-warped spatial coordinate associated with the initial spatial coordinate, the pre-warped spatial coordinate calculated as a sum of: a value of a warp path function at the initial spatial coordinate; and a delta; and control the spatial modulator to project the pixel using the pre-warped spatial coordinate.

The controller may be further to: obtain the warp path function associated with the system, to obtain the warp path function the controller is to: control the light source and the spatial modulator to project the pixel on the display element using the initial spatial coordinate to form a projected pixel; determine a displayed spatial coordinate of the projected pixel on the display element; determine a deviation of the displayed spatial coordinate from the initial spatial coordinate; and generate the warp path function to describe an inverse of the deviation.

The warp path function may comprise a piecewise polynomial.

The delta may be zero.

The delta may be a constant.

The delta may comprise a corresponding function of the initial spatial coordinate.

The corresponding function may comprise a corresponding piecewise polynomial.

The controller may be further to: select the warp path function based on one or more of: a wavelength of the source light to be used to project the pixel; and a temperature of the system.

The controller may be further to: obtain a further initial spatial coordinate of the pixel of the image, the initial spatial coordinate and the further initial spatial coordinate to describe a position of the pixel; generate a further pre-warped spatial coordinate associated with the further initial spatial coordinate, the further pre-warped spatial coordinate calculated as a corresponding sum of: a corresponding value of a further warp path function at the further initial spatial coordinate; and a further delta; and control the spatial modulator to project the pixel using the pre-warped spatial coordinate and the further pre-warped spatial coordinate.

According to yet another implementation of the present specification there is provided a system comprising: a light source to generate a source light; a spatial modulator to receive the source light from the light source; a display element to receive the source light from the spatial modulator and direct the source light towards an eye of a viewer; and a controller in communication with the light source and the spatial modulator. The controller is to: obtain an initial spatial coordinate of a pixel of an image to be projected, the initial spatial coordinate associated with a first temperature associated with the system; obtain a second temperature associated with the system; generate a pre-warped spatial coordinate of the pixel associated with the initial spatial coordinate, the pre-warped spatial coordinate calculated as a sum of: the initial spatial coordinate; and a product of a temperature change and a temperature deviation function, the temperature change comprising a difference between the second temperature and the first temperature, and the temperature deviation function describing a temperature-normalized inverse change in the initial spatial coordinate as a function of changes in temperature; and control the spatial modulator to project the pixel using the pre-warped spatial coordinate.

The controller may be further to: obtain the temperature deviation function, to obtain the temperature deviation function the controller is to: control the light source and the spatial modulator to project the pixel on the display element using the initial spatial coordinate at the first temperature to form a first projected pixel; determine a first displayed spatial coordinate of the first projected pixel on the display element; control the light source and the spatial modulator to project the pixel on the display element using the initial spatial coordinate at the second temperature to form a second projected pixel; determine a second displayed spatial coordinate of the second projected pixel on the display element; determine a deviation of the second displayed spatial coordinate from the first displayed spatial coordinate; and generate the temperature deviation function to describe an inverse of the deviation.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Figure 1:
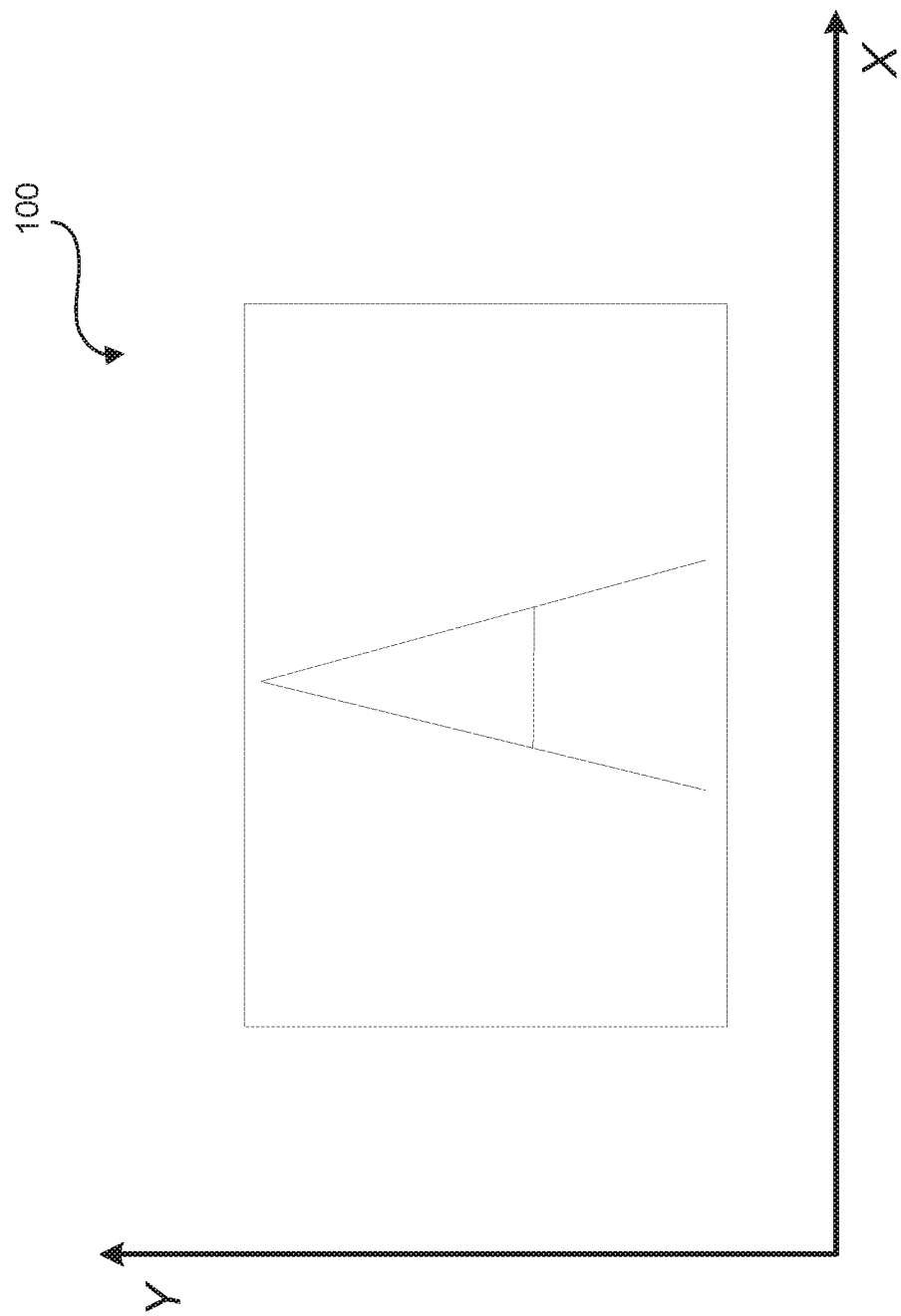
FIG. 1 shows a schematic representation of an example image.

FIG. 1 shows a schematic representation of an example image 100 to be projected. The X and Y coordinates may represent the spatial coordinates that may be used to describe the position to which each pixel of image 100 is to be projected. The X and Y coordinates may describe the position of the pixels without taking into account distortion or warping of the image that may be caused by the projection device or system. As such the X and Y coordinates may also be referred to as initial spatial coordinates.

Figure 2:
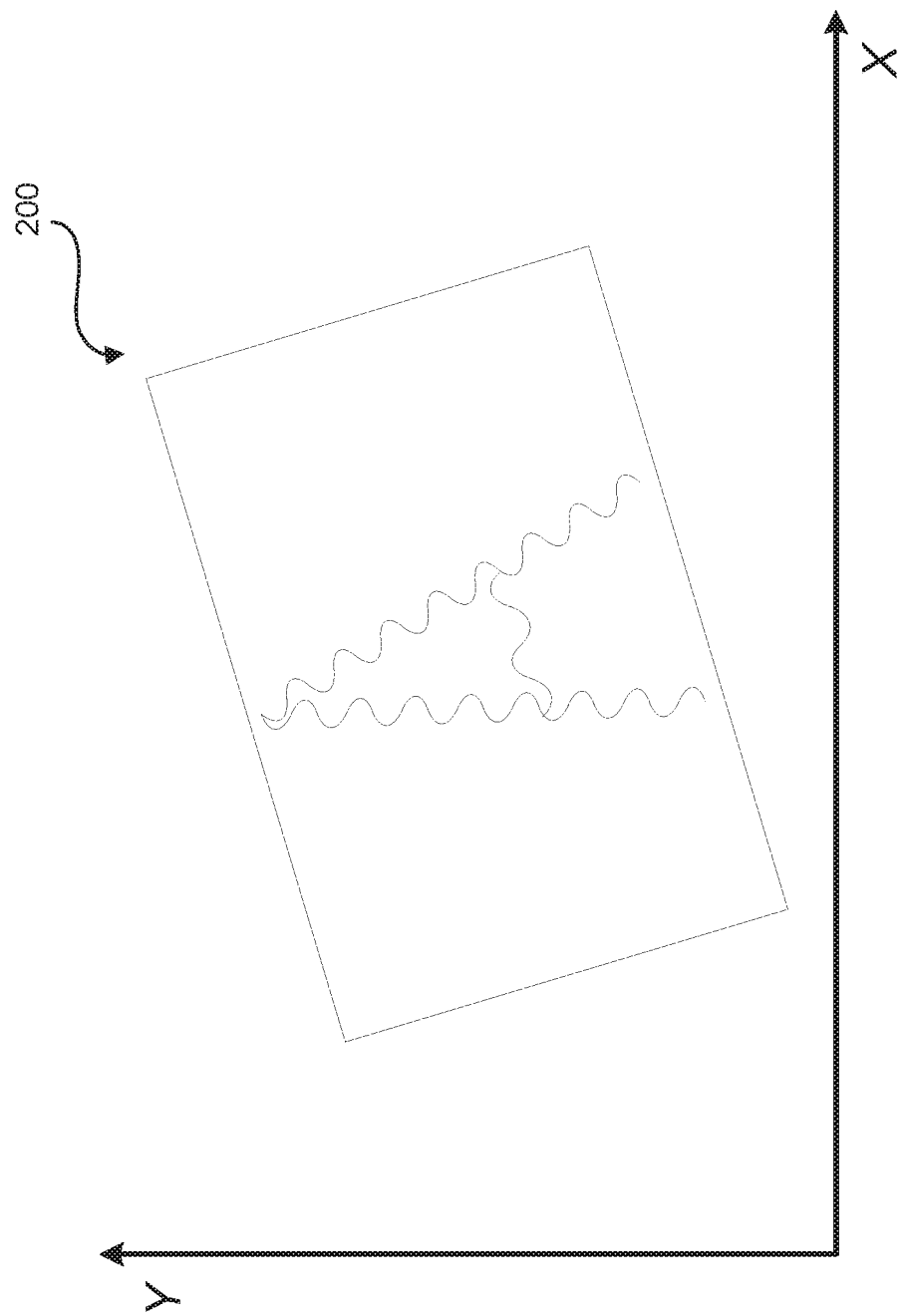
FIG. 2 shows a schematic representation of another example image.

FIG. 2 shows a schematic representation of an example image 200, which may represent how image 100 may appear when image 100 is projected by an image projection device. FIG. 2 shows that image 200 is warped compared to image 100. For example, image 200 is rotated counter-clockwise and rippled compared to image 100. This warping may be caused by the components and characteristics of the image projection device such as the device's optical elements including its lenses, reflectors, and optical combiners and by the device's operating characteristics such as its temperature.

Figure 3:
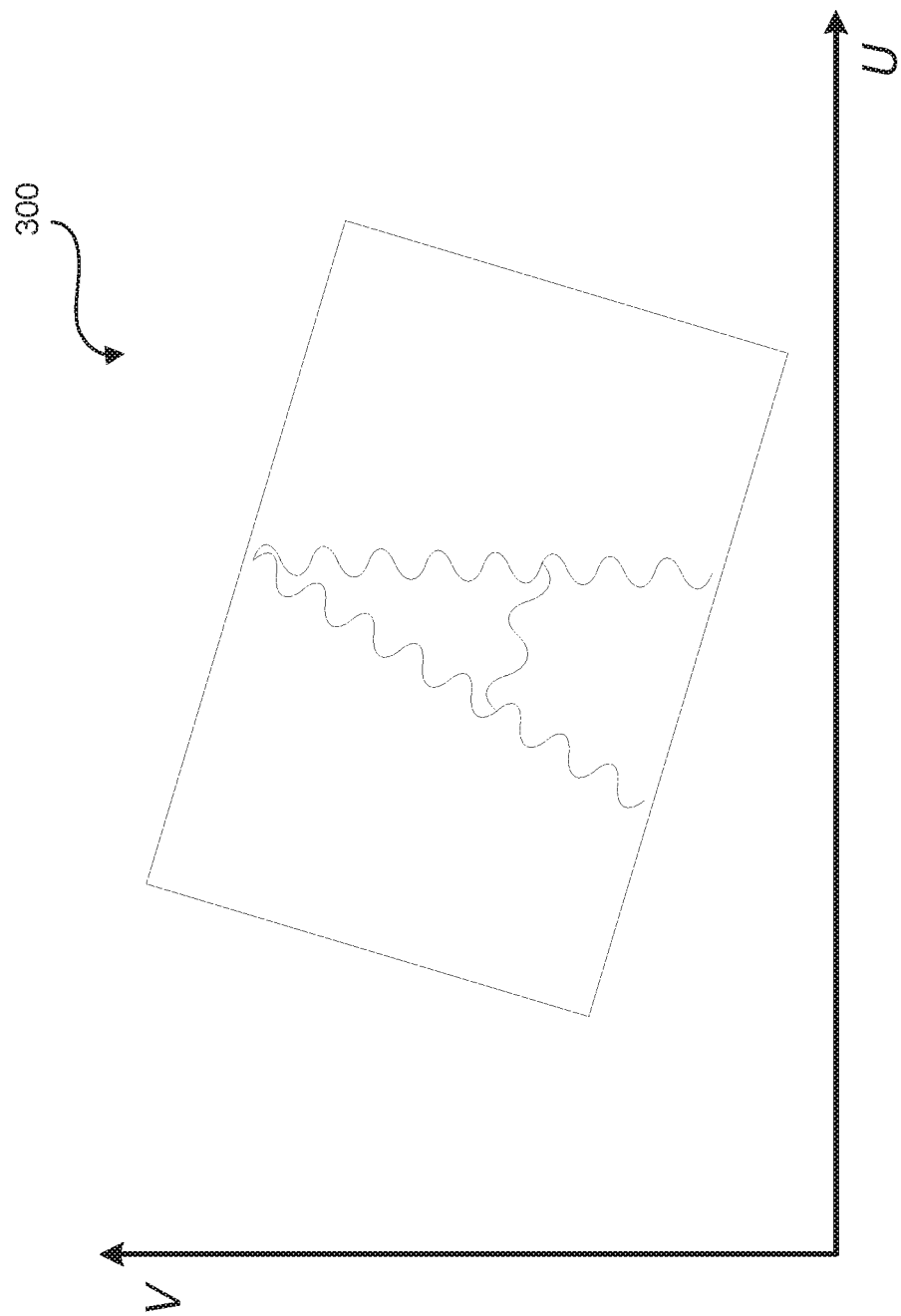
FIG. 3 shows a schematic representation of yet another example image.

In order to mitigate or counteract the warping of the projected image caused by the image projection device, the image may be pre-warped before projection in a manner that is the inverse or opposite of the warping caused by the image projection device. FIG. 3 shows a schematic representation of an example image 300, which shows a pre-warped version of image 100. If image data for pre-warped image 300 is used as the input into the image projection device, the pre-warping may mitigate or counteract the warping effect of the image projection device to display image 100 to the viewer. The axes in FIG. 3 are labeled U and V, to signify pre-warped spatial coordinates associated with the initial spatial coordinates X and Y, respectively.

The mapping between the X and Y initial spatial coordinates and the U and V pre-warped spatial coordinates may be referred to as a warp compensation map, or a "warp map" in short form. A pixel-to-pixel warp map may be used, in which a separate transformation is stored for each pixel, which when applied to pixel coordinates X and Y results in corresponding pre-warped pixel coordinates U and V. Such a pixel-to-pixel warp map may become a relatively large file taking up a correspondingly large amount of storage. In mobile devices with image projection devices, data storage and power may be limited. Examples of such mobile devices having image projection devices may include wearable heads-up displays (WHUD), as is described in greater detail in relation to FIG. 12.

Reducing the size of the warp map may provide power or space savings for a mobile device. For example, a smaller warp map may be stored in static random access memory (SRAM) rather than dynamic random access memory (DRAM). Unlike SRAM, DRAM continually uses power, which is a limited resource in a mobile device. As such, using SRAM to store the warp map may provide power savings. SRAM, on the other hand, is physically larger than DRAM for a given storage capacity. Reducing the size of the warp map may allow the use of the relatively more power-efficient SRAM to store the warp map while also allowing the SRAM storage to remain within the physical envelope of the mobile device.

Figure 4:
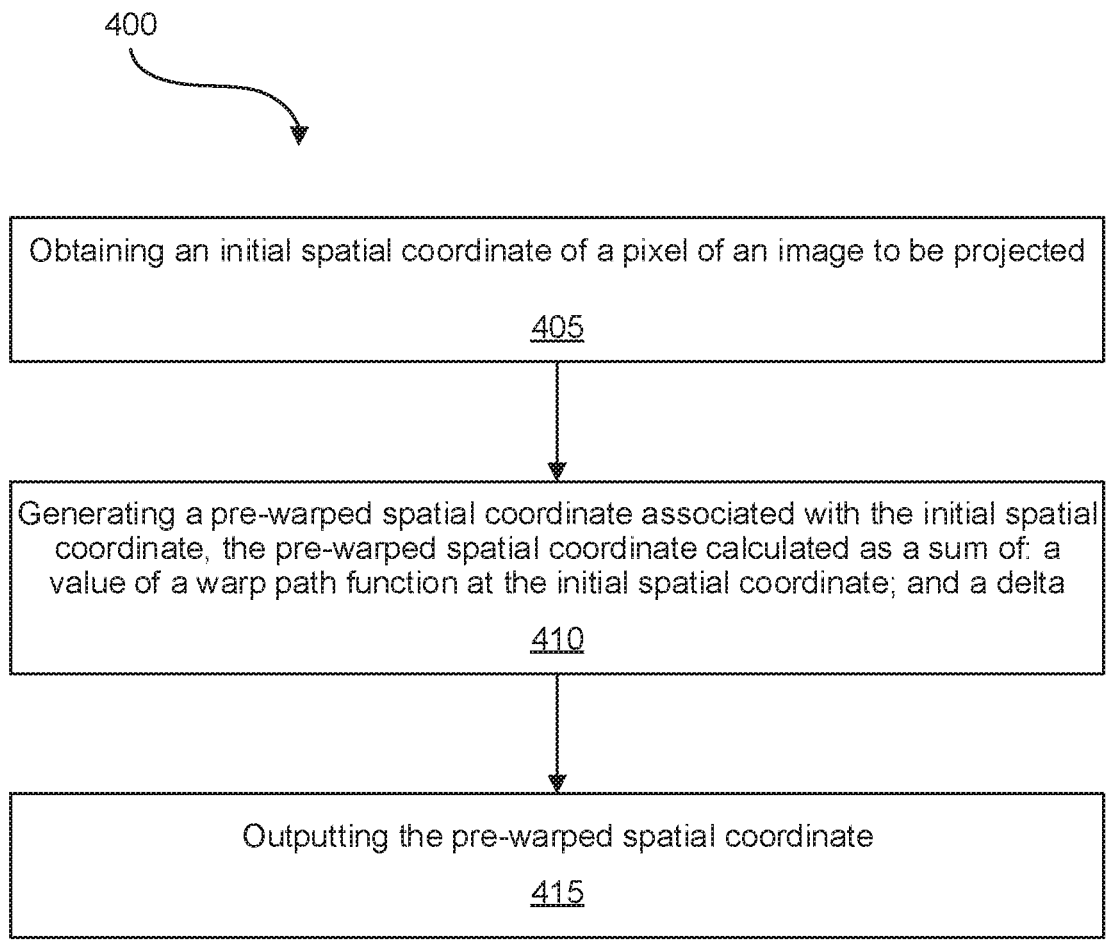
FIG. 4 shows a flowchart of an example method, in accordance with a non-limiting implementation of the present specification.

FIG. 4 shows a flowchart of an example method 400 to generate pre-warped spatial coordinates, which method may reduce or obviate the reliance on storage-intensive warp maps. At box 405, an initial spatial coordinate may be obtained for a pixel of an image to be projected. In some examples, the initial spatial coordinate may comprise the X or Y coordinate as shown for example in FIG. 1 or 2.

At box 410, a pre-warped spatial coordinate associated with the initial spatial coordinate may be generated. In some examples, the pre-warped spatial coordinate may be the U or V coordinate as shown for example in FIG. 3. The pre-warped spatial coordinate may be calculated as the sum of a value of a warp path function at the initial spatial coordinate and a delta. The calculation of the pre-warped spatial coordinate is discussed in greater detail in relation to FIGS. 5 and 6.

At box 415, the pre-warped spatial coordinate may be output. In some examples, outputting the pre-warped spatial coordinate may comprise storing the pre-warped spatial coordinate in memory, or sending the pre-warped spatial coordinate to a component or system different than where the pre-warped spatial coordinate was generated. In some examples, outputting the pre-warped spatial coordinate may comprise communicating the pre-warped spatial coordinate to an image projection device to project the pixel. Moreover, in some examples method 400 may further comprise projecting the pixel using the pre-warped spatial coordinate.

Figure 5:
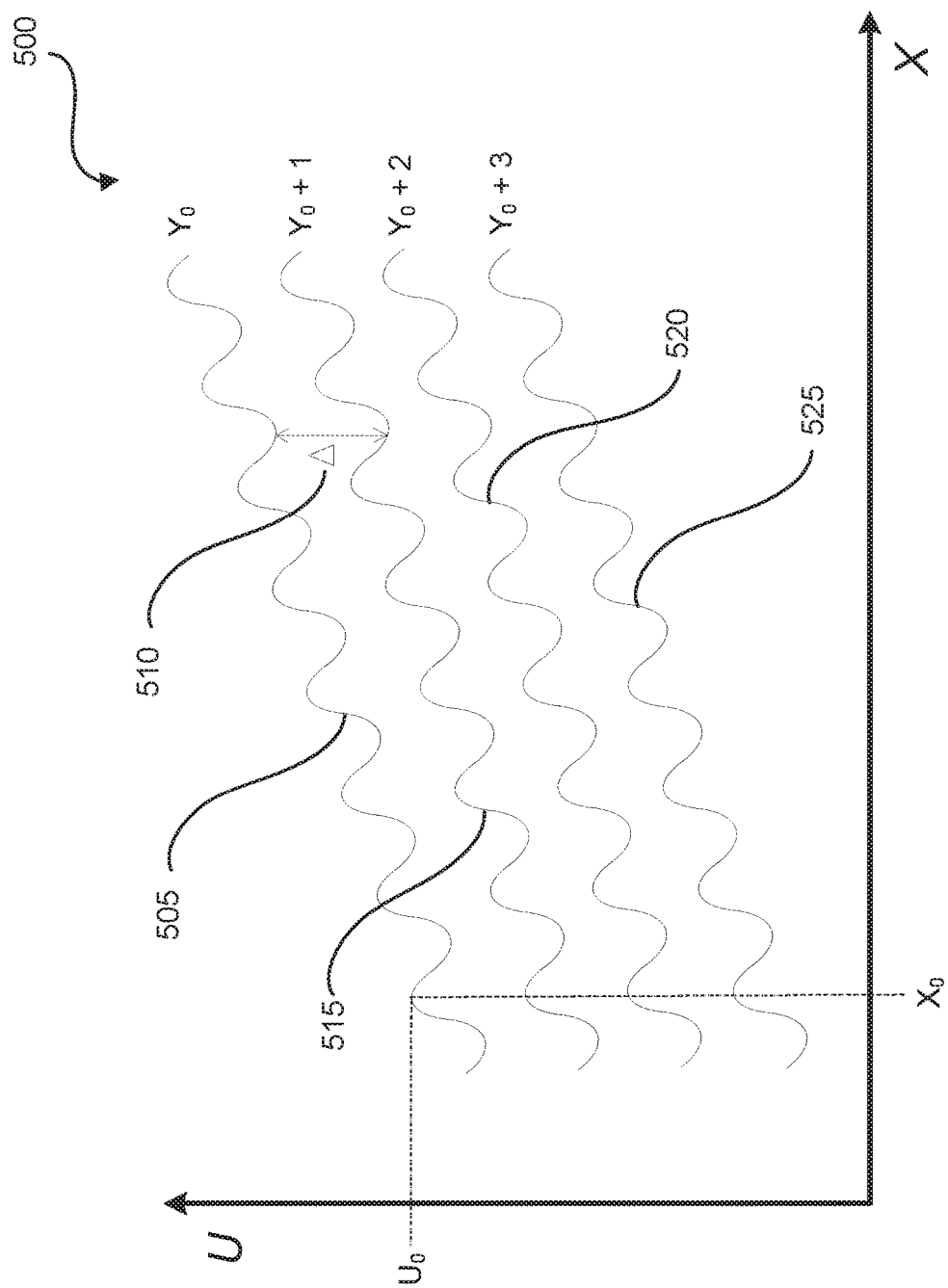
FIG. 5 shows a schematic representation of an example graph, in accordance with a non-limiting implementation of the present specification.

Turning now to FIG. 5, a schematic representation is shown of an example graph 500, which shows example warp path functions 505, 515, 520, and 525. These warp path functions, in turn, provide values for pre-warped spatial coordinates U as a function of the values of initial spatial coordinate X. For example, warp path function 505 may provide values for the pre-warped spatial coordinates U as a function of the values of the initial spatial coordinate X corresponding to a value $Y_0$ of the initial spatial coordinate Y. In order to find the value of the pre-warped spatial coordinate $U_0$ corresponding to the initial spatial coordinates $(X_0, Y_0)$, $Y_0$ may be used to select the appropriate function (warp path function 505 in this example), and then the value of warp path function 505 at $X_0$ provides the value $U_0$ of the pre-warped spatial coordinate which corresponds to the initial spatial coordinate $X_0$.

Warp path function 505 may comprise a piece-wise polynomial or spline, a second- or higher-order polynomial, a hyperbolic function, and the like. In some examples, using a piecewise polynomial may strike a balance between a more detailed or higher fidelity representation of the warping and a more storage-efficient warp map. The other warp path functions, such as warp path function 515, may then be represented as the sum of warp path function 505 and a delta 510. Delta 510 may be a constant or a variable. In some examples, delta 510 many also comprise a function of X. For example, delta 510 may comprise a piecewise polynomial function of X.

The other warp path functions 520 and 525 may also be represented as a sum of a warp path function and a delta. In some examples, a given warp path function may be defined as the sum of an adjacent warp path function and a delta. For example, if a given warp path function is represented as f(X), then $f_{Y_0+n}(X)=f_{Y_0+(n-1)}(X)+\Delta_n$, where n is a natural number equal to or greater than one. Moreover, in some examples a given warp path function may be defined as the sum of an initial or designated warp path function and a delta; for example, $f_{Y_0+m}(X)=f_{Y_0}(X)+\Delta_m$, where m is a whole number greater than or equal to zero. In cases where the pre-warped spatial coordinate is provided by the initial or designated warp path function $f_{Y_0}(X)$, m may equal zero and $\Delta_0$ may also equal zero. Representing or storing the warp map in terms of sums of values of warp path functions and a delta may reduce the amount of storage needed to store the warp map.

While FIG. 5 shows four warp path functions, it is contemplated that a different number of warp path functions may be used. In addition, the shape of the curve associated with the warp path functions shown in FIG. 5 is for illustrative purposes, and it is contemplated that different curves or functions may be also used. Moreover, it is contemplated that in some examples the warp path functions and their corresponding curves need not be the same as one another, and may be different from one another. Furthermore, it is contemplated that in some examples a warp path function other than function 505 may be designated as the initial or designated warp path function $f_{Y_6}(X)$. In such examples, the values of delta may be positive or negative.

Figure 6:
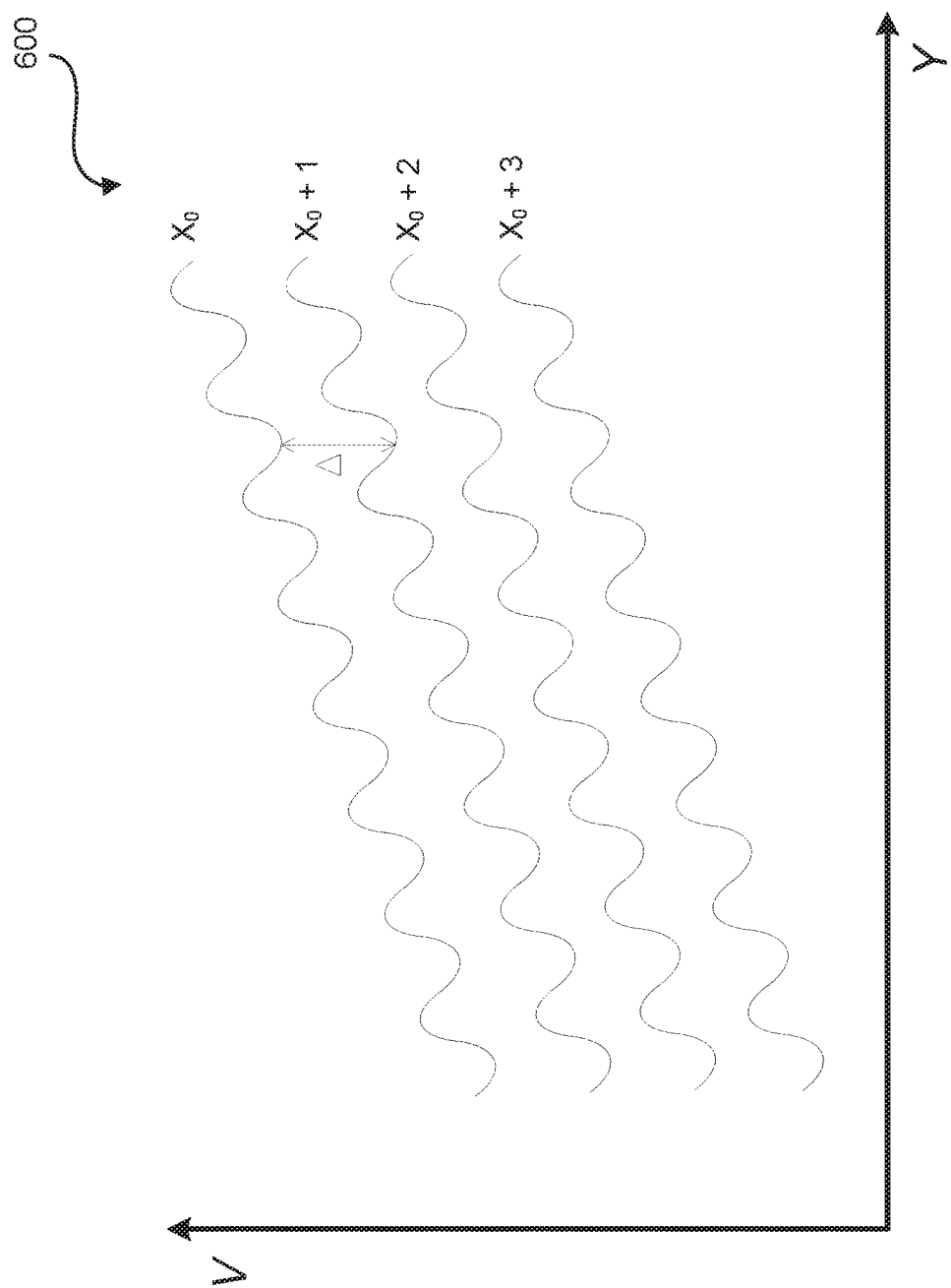
FIG. 6 shows a schematic representation of another example graph, in accordance with a non-limiting implementation of the present specification.

While FIG. 5 shows example warp path functions and delta for obtaining a pre-warped spatial coordinate U as a function of initial spatial coordinate X, a similar approach using warp path functions and deltas may be used to obtain pre-warped spatial coordinates V as a function of initial spatial coordinates Y. FIG. 6 shows an example plot 600 which in turn shows exemplary and illustrative warp path functions and a delta. The warp path functions, deltas, and the corresponding calculation of the pre-warped spatial coordinates V associated with FIG. 6 may be similar to the warp path functions, deltas, and the calculation of the pre-warped spatial coordinates U described in relation to FIG. 5.

In the context of color image projection, different wavelength ranges or colors of the projection light may be warped differently by the image projection device. In such examples, the warp path function may in turn be a function of or selected based on the wavelength of the light used to project the pixel. In other words, the warp maps and the warp path functions may be color- or wavelength-specific. In some examples, for each set of initial spatial coordinates (X, Y), a plurality of sets of pre-warped spatial coordinates (U, V) may be generated. For example, in projection systems which use a red light source, a green light source, and a blue light source, for each set of initial spatial coordinates (X, Y), three sets of pre-warped spatial coordinates (U, V) may be generated. This may include a (U, V) set for red light, a different (U, V) set for green light, and a different (U, V) set for blue light. In addition, the temperature of the image projection device may also impact the warping of the image by the device. As such, in some examples the warp maps and the warp path functions may also be specific to given temperatures or temperature ranges. Mitigating or counteracting the warping effect of temperature changes is described in greater detail in relation to FIGS. 8 and 9.

Moreover, while the use of warp path functions and deltas are described in the context of image projection to pre-warp the initial spatial coordinates (X,Y) to form pre-warped spatial coordinates (U,V), it is contemplated that specifying the transformation of data using (warp) path functions and deltas is not limited to image projection, any may be used generally as a storage-efficient method of encoding data.

Figure 7:
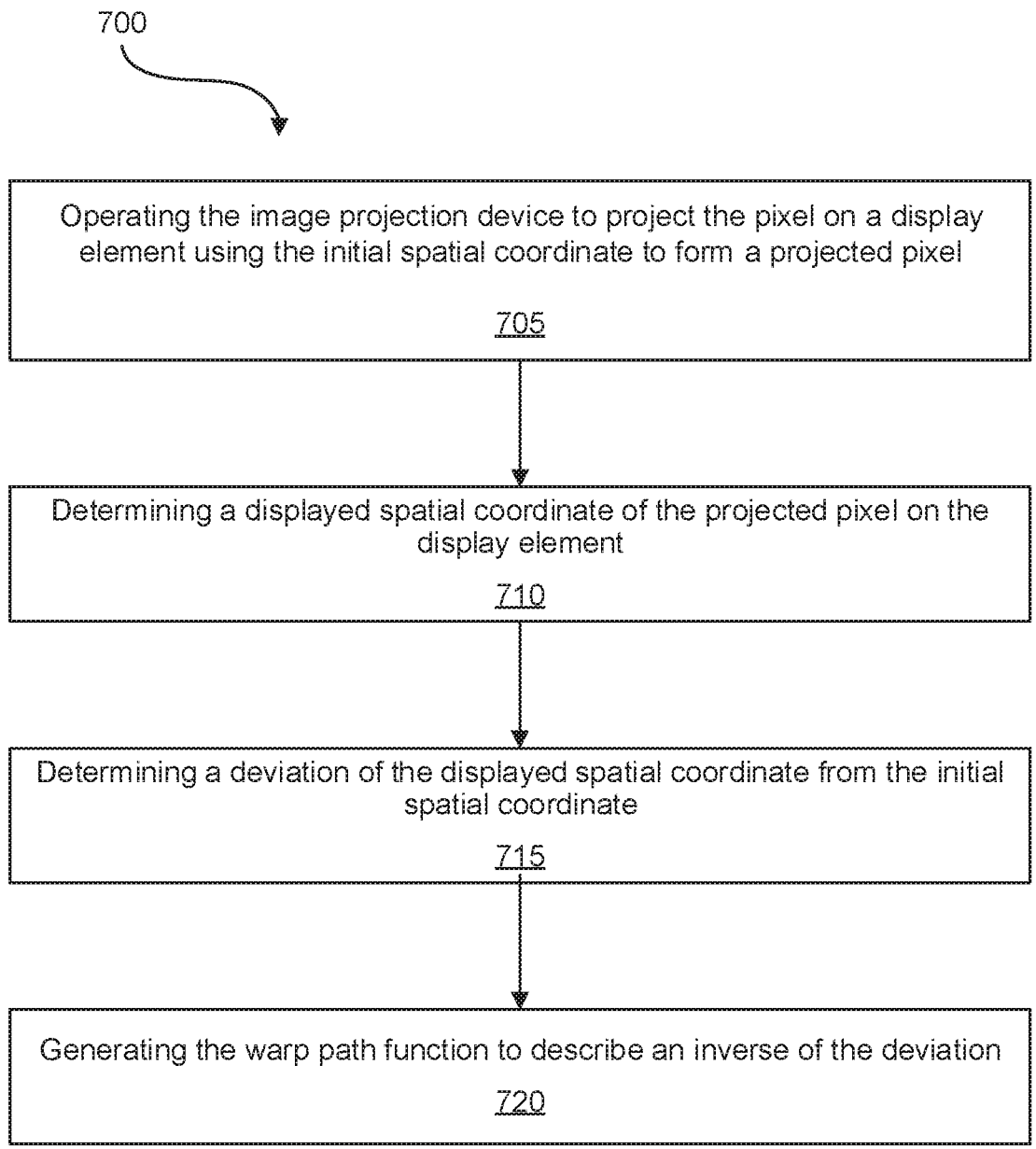
FIG. 7 shows a flowchart of another example method, in accordance with a non-limiting implementation of the present specification.

In some examples, calibration may be used to obtain the warp path functions for a given system such as a given image projection device. FIG. 7 shows a flowchart of an example method 700, which may be used to obtain the warp path function associated with an image projection device. In some examples, method 700 may be performed as part of method 400. At box 705, the image projection device may be operated to project the pixel on a display element using the initial spatial coordinate to form a projected pixel.

At box 710, a displayed spatial coordinate of the projected pixel on the display element may be determined. In some examples a photo detector or a camera may be used to determine the displayed spatial coordinate. Moreover, at box 715 a deviation of the displayed spatial coordinate from the initial spatial coordinate may be determined. For example, if the initial spatial coordinates indicate that a given pixel is to be at spatial coordinates $(X_0, Y_0)$ and the displayed spatial coordinates are $(X_0+\alpha, Y_0\beta)$, then a would represent the deviation in the X spatial coordinate and $\beta$ would represent the deviation in the Y spatial coordinate.

Furthermore, at box 720 the warp path function may be generated to describe an inverse of the deviation. The inverse of the deviation may be the inverse or the opposite of the transformation or warping that caused the deviation. For example, if the deviation at $X_0$ is the addition of $\alpha$, then the inverse would subtract $\alpha$ from $X_0$. In this manner, the warp path functions may be derived during an initial calibration from the deviations between the initial and displayed spatial coordinates.

In addition, it is contemplated that in some examples the warp path functions may be generated using mathematical or computer models of the image projection device, and need not use a physical or empirical calibration of the system. Moreover, in some examples machine learning models may be used to predict deviations or generate warp path functions for a given image projection device, which in turn may obviate the need for a physical or empirical calibration of that given projection device.

In addition to the warping caused by the physical structure and the optical elements of the image projection device, temperature changes may also have a warping effect on the projected image. This temperature-induced warping may be due to the effects of temperature changes on the dimensions and geometry of the image display device and on the optical properties of its optical elements. Similar to the pre-warping used to mitigate the effects of warping caused by the projection device, pre-warping may also be used to partially or fully counteract the warping effects of temperature changes.

Figure 8:
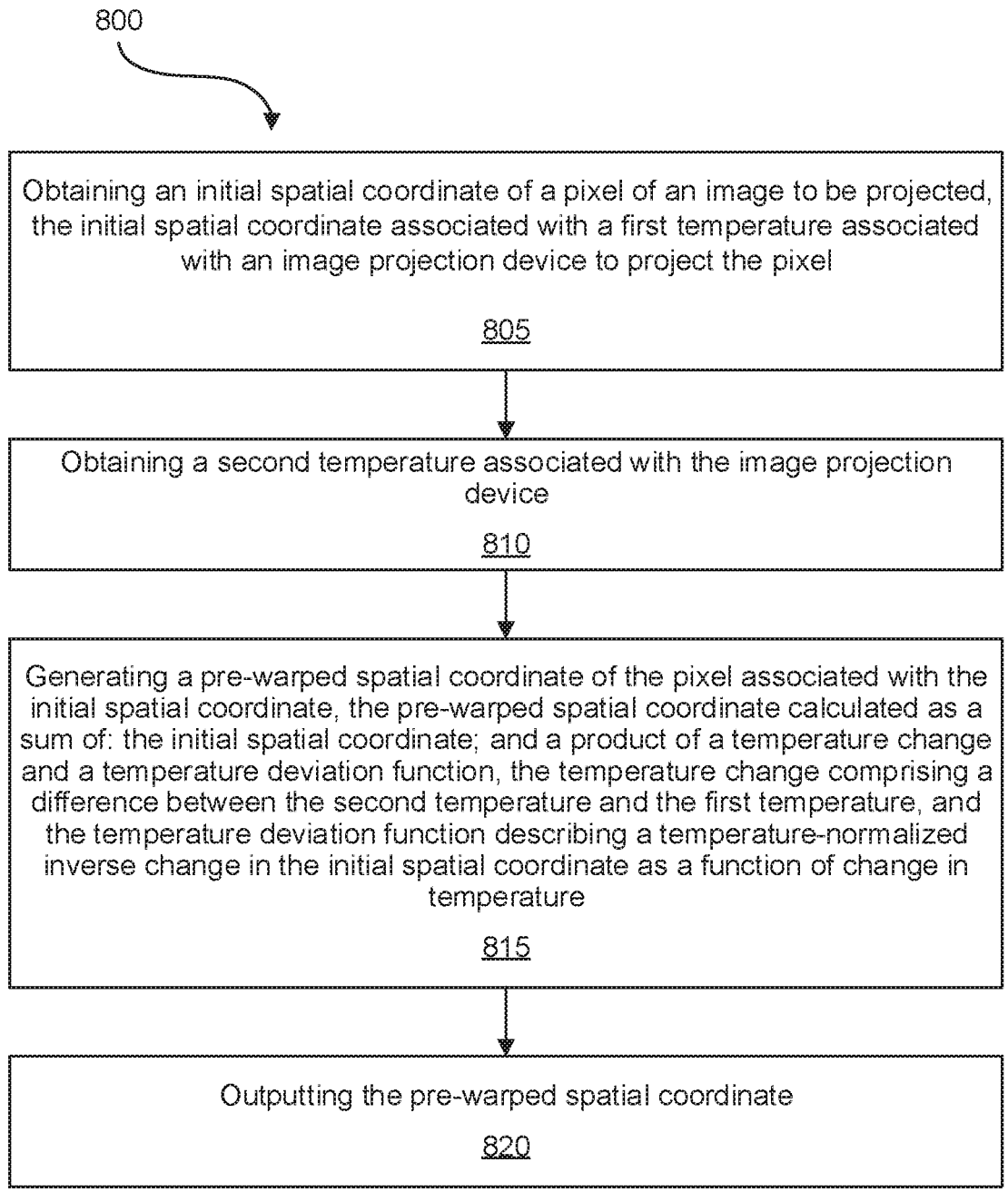
FIG. 8 shows a flowchart of yet another example method, in accordance with a non-limiting implementation of the present specification.

FIG. 8 shows a flowchart of an example method 800, which may be used to pre-warp an image to mitigate the effects of temperature-induced warping. At box 805, an initial spatial coordinate may be obtained for a pixel of an image to be projected. The initial spatial coordinate may be associated with a first temperature associated with an image projection device to project the pixel. In some examples, the first temperature may form a baseline temperature.

At box 810, a second temperature associated with the image projection device may be obtained. In some examples, the second temperature may represent the operating temperature of the projection device. Moreover, in some examples an onboard temperature sensor may be used to sense the operating temperature of the projection device. Furthermore, in some examples the second temperature may be associated with components of the projection device that have a relatively large impact on image projection such as the light source, the projection optics, the display element, and the like. In some examples, the ambient temperature may be used as an indication of the operating temperature of the image projection device.

At box 815, a pre-warped spatial coordinate may be generated for the pixel associated with the initial spatial coordinate. The pre-warped spatial coordinate may be calculated as a sum of the initial spatial coordinate and the product of a temperature change and a temperature deviation function. The temperature change may comprise a difference between the second temperature and the first temperature. In other words, the temperature change may represent the difference between the operating temperature and the baseline temperature.

The temperature deviation function may describe a temperature-normalized inverse change in the initial spatial coordinate as a function of change in temperature. The inverse change may comprise a change or warping that is the inverse or opposite of the warping caused by temperature changes. Moreover, the deviation function may be temperature-normalized to describe changes in the initial spatial coordinate on a per-unit-temperature basis. For example, if the temperature changes are measured in degrees Celsius, then the deviation function may describe changes in the spatial coordinate on a per-degree-Celsius basis. In some examples, the changes in the spatial coordinate may be constant as a function of changes in temperature. Moreover, in some examples the changes in the spatial coordinate may be variable and may themselves be a function of the changes in temperature.

Once the pre-warped spatial coordinate is generated, at box 820 the pre-warped spatial coordinate may be output. In some examples, outputting the pre-warped spatial coordinate may comprise storing the pre-warped spatial coordinate in memory, or sending the pre-warped spatial coordinate to a component or system different than where the pre-warped spatial coordinate was generated. In some examples, outputting the pre-warped spatial coordinate may comprise communicating the pre-warped spatial coordinate to an image projection device to project the pixel. Moreover, in some examples method 800 may further comprise projecting the pixel using the pre-warped spatial coordinate.

This type of temperature-based pre-warping may be performed for both X and Y spatial coordinates to describe the position of the pixels of the image to be projected. Upon pre-warping, initial spatial coordinates (X, Y) may be transformed to pre-warped spatial coordinates (U, V). In some examples, the pre-warpings described in relation to methods 400 and 800 may be performed in conjunction with one another to mitigate the warping effects of both the structural and optical elements of the image projection device as well as its temperature.

The method of defining and storing the temperature warp map described in relation to method 800 may allow the warp map to have a smaller file size and to be more storage-efficient. In addition, the temperature warp maps and pre-warpings described herein may allow for mitigating temperature-induced warping over a range of temperatures at relatively small temperature increments.

Figure 9:
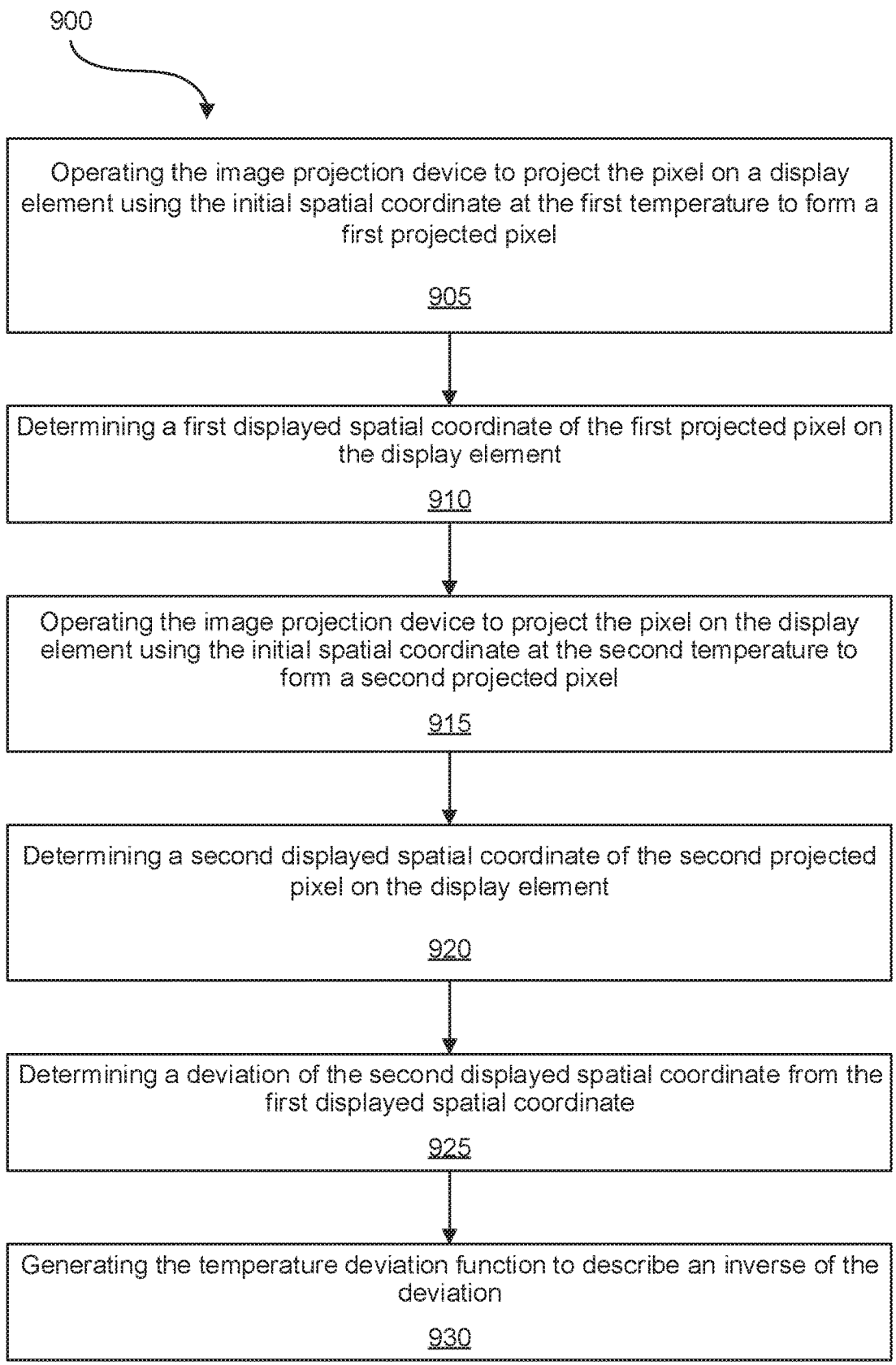
FIG. 9 shows a flowchart of yet another example method, in accordance with a non-limiting implementation of the present specification.

Moreover, in order to obtain the temperature deviation function for a given image projection device, a calibration or empirical testing of the projection device may be performed. FIG. 9 shows a flowchart of an example method 900, which may be used to obtain the temperature deviation function for a given image projection device. At box 905, the image projection device may be operated to project the pixel on a display element using the initial spatial coordinate at the first temperature to form a first projected pixel.

At box 910, a first displayed spatial coordinate may be determined for the first projected pixel as projected on the display element. In some examples a photo detector or a camera may be used to determine the first displayed spatial coordinate. Moreover, at box 915 the image projection device may be operated to project the pixel on the display element using the initial spatial coordinate at the second temperature to form a second projected pixel. Furthermore, at box 920 a second displayed spatial coordinate may be determined for the second projected pixel as projected on the display element.

At box 925 a deviation of the second displayed spatial coordinate from the first displayed spatial coordinate may be determined. Then, at box 930 the temperature deviation function may be generated to describe an inverse of the deviation. In some examples the calibration described in relation to method 900 may be performed for the range of temperatures in the typical operating temperatures of the image projection device. The resulting temperature deviation functions may allow for pre-warping the spatial coordinates to mitigate the temperature-induced warping for many or most of the temperatures in the operating temperature range of the image projection device.

In addition, as described above in relation to method 700, in some examples mathematical or computer models, such as machine learning models, may be used to obtain the temperature deviation functions. The use of such models may reduce the need for physical or empirical calibration of the image projection device.

Figure 10:
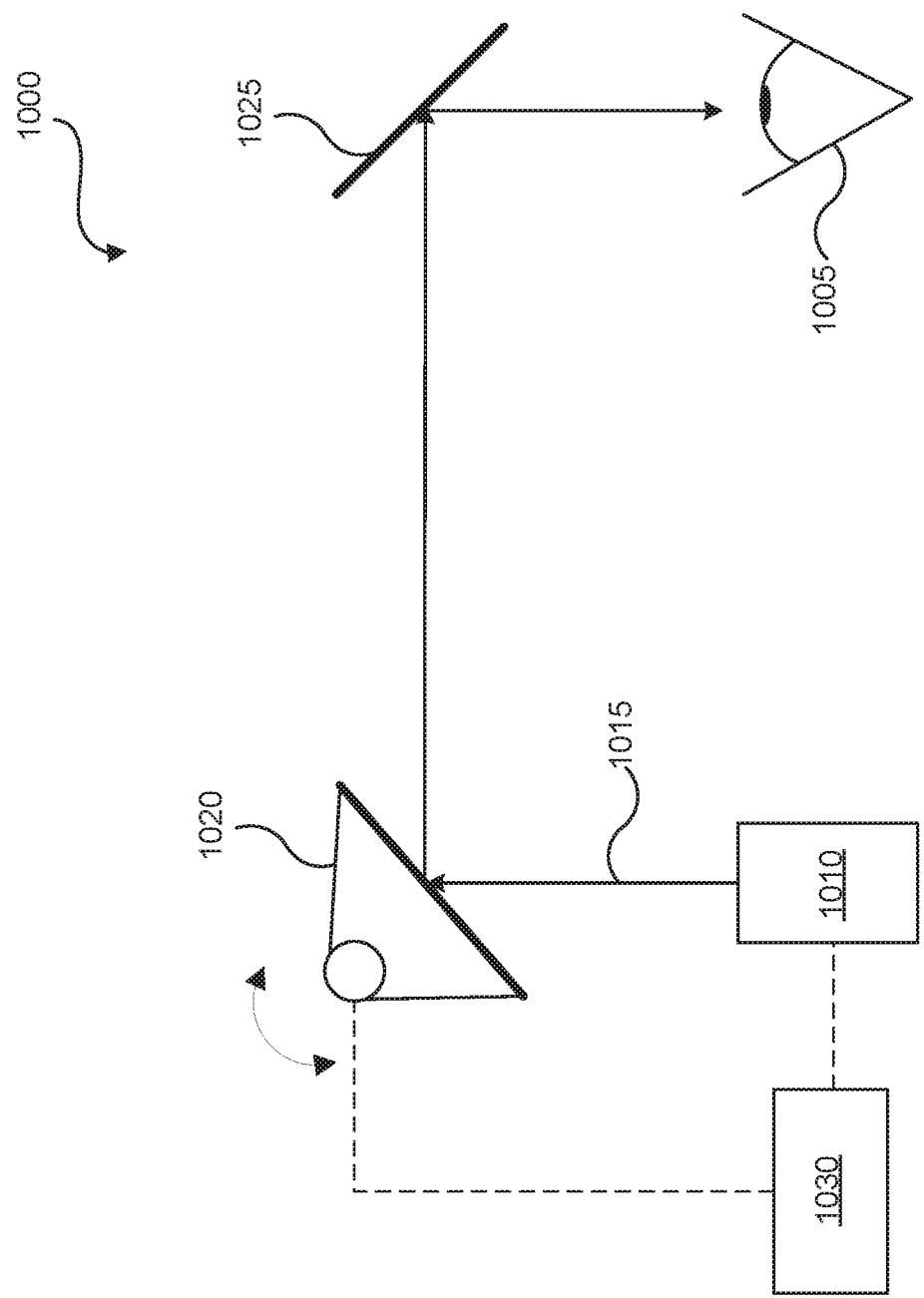
FIG. 10 shows a schematic representation of an example system, in accordance with a non-limiting implementation of the present specification.

Turning now to FIG. 10, a schematic representation of an example system 1000 is shown. System 1000 may be used to form or project an image viewable by an eye 1005 of a viewer. System 1000 may also be referred to or described as an image projection device. System 1000 may comprise a light source 1010 to generate a source light 1015. Light source 1010 may comprise a laser, a light emitting diode, and the like. System 1000 may also comprise a spatial modulator 1020 to receive source light 1015 from light source 1010. In some examples, spatial modulator 1020 may comprise a movable reflector, a micro-electro-mechanical system (MEMS), a digital micromirror device (DMD), and the like. In some examples, spatial modulator 1020 may comprise a single MEMS mirror rotatable along two orthogonal axes (i.e. a bi-axial scan mirror). Moreover, in some examples spatial modulator 1020 may comprise two MEMS mirrors, one mirror rotatable along a first axis and the other mirror rotatable along a different axis, preferably an orthogonal axis (i.e. two single-axial scan mirrors).

Furthermore, system 1000 may comprise an optical element 1025 to receive source light 1015 from spatial modulator 1020 and direct the source light towards eye 1005 of a viewer. In some examples, optical element 1025 may comprise an optical combiner such as a holographic optical combiner, and the like. Moreover, in some examples system 1000 may be a part of or incorporated into a wearable heads-up display. Such a heads-up display may have different designs or form factors, such as the form factor of eyeglasses, as is described in greater detail in relation to FIG. 12. In examples where system 1000 is in the form factor of glasses, optical element 1025 may be on or in a lens of the glasses.

In addition, system 1000 comprises a controller 1030 in communication with light source 1010 and spatial modulator 1020. Controller 1030 may control light source 1010 and spatial modulator 1020 to project an image. In some examples, the image to be projected may be a still image, or a portion or frame of a moving image or video. Controller 1030 may obtain an initial spatial coordinate of a pixel of the image to be projected. Controller 1030 may then generate a pre-warped spatial coordinate associated with the initial spatial coordinate. The pre-warped spatial coordinate may be calculated as a sum of a value of a warp path function at the initial spatial coordinate and a delta. Moreover, controller 1030 may control spatial modulator 1020 to project the pixel using the pre-warped spatial coordinate. In some examples, controller 1030 may also control light source 1010 in order to project the pixel of the image.

Controller 1030 may also perform a similar pre-warping operation for a further initial spatial coordinate of the image to form a further pre-warped spatial coordinate. The initial spatial coordinate and the further initial spatial coordinate may describe a position of the pixel in the (X, Y) plane. Similarly, the pre-warped spatial coordinate and the further pre-warped spatial coordinate may describe the position of the pixel in the pre-warped (U, V) plane.

In some examples, controller 1030 may obtain a warp path function associated with system 1000. To obtain the warp path function controller 1030 may control light source 1010 and spatial modulator 1020 to project the pixel on display element 1025 using the initial spatial coordinate to form a projected pixel. Controller 1030 may then determine a displayed spatial coordinate of the projected pixel on display element 1025. In some examples, system 1000 may also comprise a photo detector or a camera to sense the projected pixel and provide information regarding the position of the projected pixel to controller 1030.

Moreover, controller 1030 may determine a deviation of the displayed spatial coordinate from the initial spatial coordinate, and may then generate the warp path function to describe an inverse of the deviation. In some examples the warp path function may comprise a piecewise polynomial or a spline, a polynomial, a hyperbolic function, and the like. Furthermore, in some examples delta may be zero, a constant, or may comprise a function of the initial spatial coordinate. In some examples, delta itself may comprise a piecewise polynomial.

In addition, in some examples controller 1030 may select the warp path function based on one or more of a wavelength of source light 1015 to be used to project the pixel and a temperature of system 1000. In general, system 1000 and its controller 1030 may have the features or perform the functions described herein in relation to methods 400, 700, 800, 900 and the other methods described herein.

Figure 11:
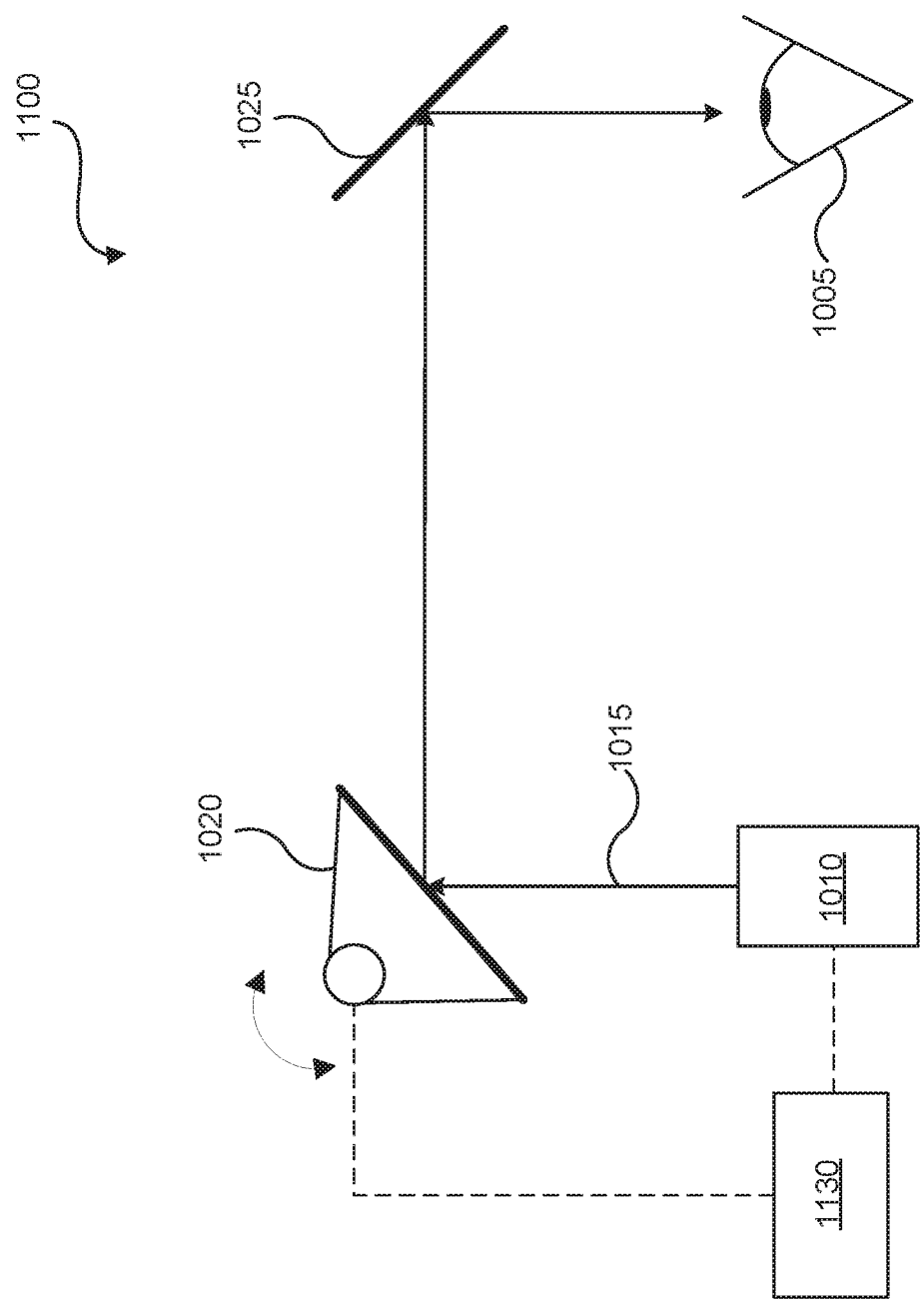
FIG. 11 shows a schematic representation of another example system, in accordance with a non-limiting implementation of the present specification.

Turning now to FIG. 11, a schematic representation of an example system 1100 is shown. System 1100 may be similar to system 1000, with a difference being that system 1100 comprises a controller 1130, which may be different than controller 1030. Controller 1130 may obtain an initial spatial coordinate of a pixel of an image to be projected. The initial spatial coordinate may be associated with a first temperature associated with system 1100. Moreover, controller 1130 may obtain a second temperature associated with system 1100.

Furthermore, controller 1130 may generate a pre-warped spatial coordinate of the pixel, which pre-warped spatial coordinate may be associated with the initial spatial coordinate. The pre-warped spatial coordinate may be calculated as a sum of the initial spatial coordinate and a product of a temperature change and a temperature deviation function. The temperature change may comprise a difference between the second temperature and the first temperature. In addition, the temperature deviation function may describe a temperature-normalized inverse change in the initial spatial coordinate as a function of changes in temperature. Controller 1130 may also control spatial modulator 1020 to project the pixel using the pre-warped spatial coordinate. In some examples, controller 1130 may also control light source 1010 in order to project the pixel using the pre-warped spatial coordinate.

In some examples, controller 1130 may perform a similar temperature-based pre-warping of a further initial spatial coordinate, which together with the spatial coordinate may describe a position of the pixel. In addition, in some examples controller 1130 may obtain the temperature deviation function. To obtain the temperature deviation function controller 1130 may control light source 1010 and spatial modulator 1020 to project the pixel on display element 1025 using the initial spatial coordinate at the first temperature to form a first projected pixel.

Controller 1130 may then determine a first displayed spatial coordinate of the first projected pixel on display element 1025. In some examples, system 1100 may also comprise a photo detector or a camera to sense the projected pixel and provide information regarding the position of the projected pixel to controller 1130. Moreover, controller 1130 may control light source 1010 and spatial modulator 1020 to project the pixel on display element 1025 using the initial spatial coordinate at the second temperature to form a second projected pixel. Controller 1130 may then determine a second displayed spatial coordinate of the second projected pixel on display element 1025.

In addition, controller 1130 may determine a deviation of the second displayed spatial coordinate from the first displayed spatial coordinate, and may generate the temperature deviation function to describe an inverse of the deviation. In general, system 1100 and its controller 1130 may have the features or perform the functions described herein in relation to methods 400, 700, 800, 900 and the other methods described herein.

In some examples, the controllers described herein such as controllers 1030 and 1130 may comprise a processor in communication with a non-transitory processor-readable medium. The processor-readable medium may comprise instructions to cause the processors to control the light source and the spatial modulator as described in relation to the methods and systems described herein. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 12:
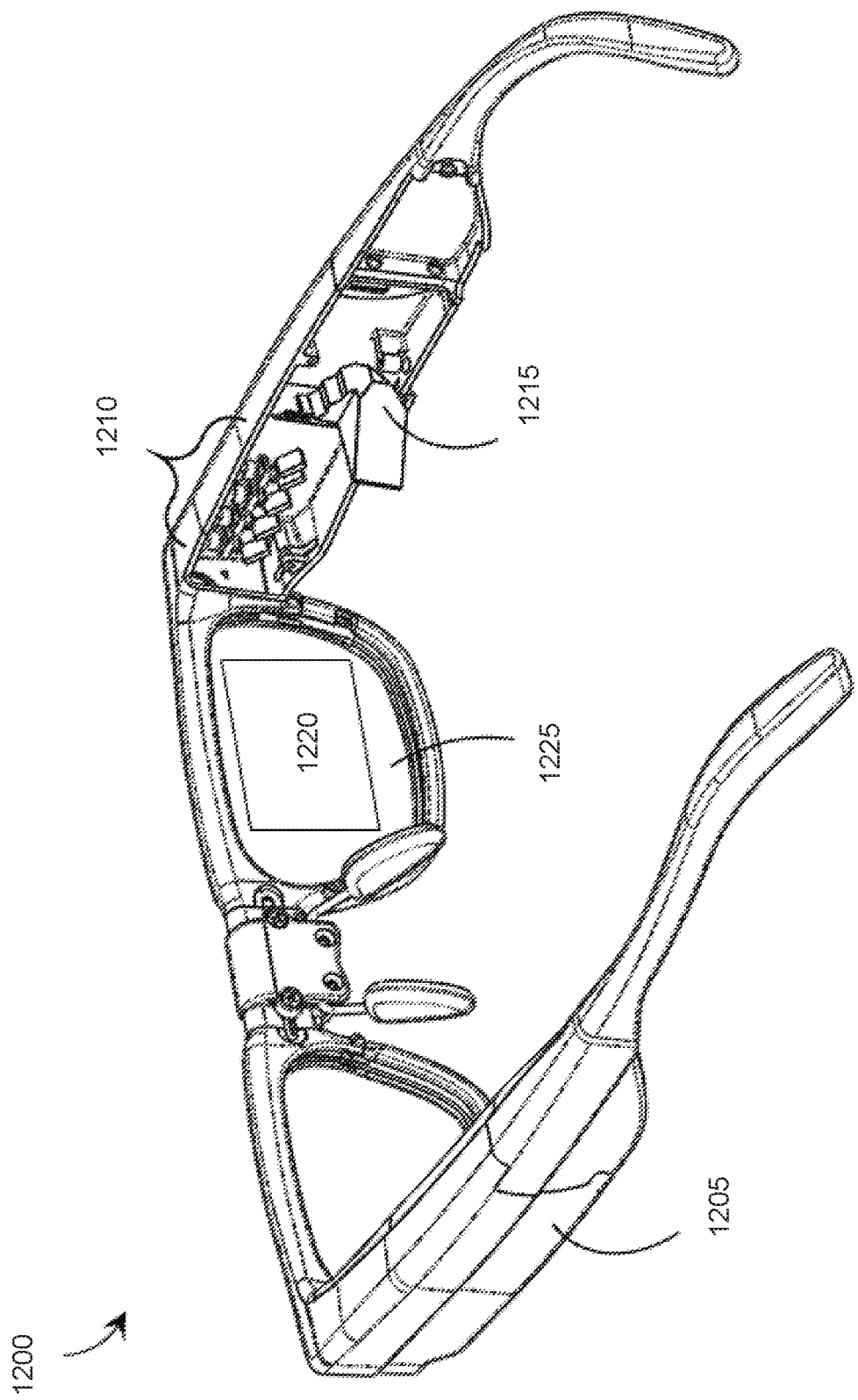
FIG. 12 shows a schematic representation of yet another example system, in accordance with a non-limiting implementation of the present specification.

Turning now to FIG. 12, a partial-cutaway perspective view of an example wearable heads-up display (WHUD) 1200 is shown. WHUD 1200 includes a support structure 1205 that in use is worn on the head of a user and has the general form factor and appearance of an eyeglasses (e.g., sunglasses) frame. Eyeglasses or sunglasses may also be generically referred to as "glasses". Support structure 1205 may carry components of a system to display an image and pre-warp that image, such as systems 1000 and 1100. For example, the light source module may be received in a space 1210 in a side arm of support structure 1205. In other examples, one or more of the image projection and pre-warping system components or systems described herein may be received in or carried by support structure 1205.

The spatial modulator of the systems described herein may be received in or be part of component 1215 of support structure 1205. The spatial modulator in turn may direct the source light onto a display element 1220 carried by a lens 1225 of support structure 1205. In some examples, display element 1220 may be similar in structure or function to display element 1025.

The term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, or supported by, with or without any number of intermediary physical objects therebetween.

It is contemplated that the systems described herein may have the features or perform the functions described in relation to methods 400, 700, 800, 900 and the other methods described herein. Furthermore, it is contemplated that in some examples the systems described herein may carry out methods or perform functions other than those of the methods described herein.

In addition, it is contemplated that the methods described herein may include the features or perform the functions described in relation to the systems described herein. Moreover, while methods 400, 700, 800, 900 and the other methods described herein may be performed by some or all of the systems described herein, it is contemplated that in some examples methods 400, 700, 800, 900 and the other methods described herein may also be performed using systems or devices other than the systems described herein.

Throughout this specification and the appended claims, infinitive verb forms are often used. Examples include, without limitation: "to generate," "to control," "to obtain," "to determine," and the like. Unless the specific context requires otherwise, such infinitive verb forms are used in an open, inclusive sense, that is as "to, at least, generate," to, at least, control," "to, at least, obtain," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method comprising:
obtaining a set of initial spatial coordinates of a pixel of an image to be projected, the set of initial spatial coordinates comprising a first initial spatial coordinate corresponding to a first dimension and a second initial spatial coordinate corresponding to a second dimension;
selecting a first function based on a first value of the second initial spatial coordinate;
generating a first pre-warped spatial coordinate associated with the first initial spatial coordinate using the first function, the first function comprising a sum of:
a value of a first warp path function at the first spatial coordinate; and
a first delta; and
outputting the first pre-warped spatial coordinate.

2. The method of claim 1, wherein the outputting the first pre-warped spatial coordinate comprises communicating the first pre-warped spatial coordinate to an image projection device to project the pixel.

3. The method of claim 1, further comprising:
projecting the pixel using the first pre-warped spatial coordinate.

4. The method of claim 1, further comprising:
obtaining the first warp path function associated with an image projection device, comprising:
operating the image projection device to project the pixel on a display element using the first initial spatial coordinate to form a projected pixel;
determining a displayed spatial coordinate of the projected pixel on the display element;
determining a deviation of the displayed spatial coordinate from the first initial spatial coordinate; and
generating the first warp path function to describe an inverse of the deviation.

5. The method of claim 1, wherein the first warp path function comprises a piecewise polynomial.

6. The method of claim 1, wherein the first delta is a constant.

7. The method of claim 1, wherein the first delta comprises a corresponding function of the first initial spatial coordinate.

8. The method of claim 1, further comprising:
selecting the first warp path function based on one or more of:
a wavelength of a light to be used to project the pixel; and
a temperature of an image projection device to project the pixel.

9. The method of claim 1, further comprising:
selecting a second function based on a second value of the first initial spatial coordinate;
generating a second pre-warped spatial coordinate associated with the second initial spatial coordinate using the second function, the second function comprising a sum of:
a corresponding value of a further second warp path function at the second initial spatial coordinate; and
a second delta; and
outputting the second pre-warped spatial coordinate.

10. A method comprising:
obtaining an initial spatial coordinate of a pixel of an image to be projected, the initial spatial coordinate associated with a first temperature associated with an image projection device to project the pixel;
obtaining a second temperature associated with the image projection device;
generating a pre-warped spatial coordinate of the pixel associated with the initial spatial coordinate, the pre-warped spatial coordinate calculated as a sum of:
the initial spatial coordinate; and
a product of a temperature change and a temperature deviation function, the temperature change comprising a difference between the second temperature and the first temperature, and the temperature deviation function describing a temperature-normalized inverse change in the initial spatial coordinate as a function of change in temperature; and
outputting the pre-warped spatial coordinate.

11. The method of claim 10, wherein the outputting the pre-warped spatial coordinate comprises communicating the pre-warped spatial coordinate to the image projection device to project the pixel.

12. The method of claim 10, further comprising:
projecting the pixel using the pre-warped spatial coordinate.

13. The method of claim 10, further comprising:
obtaining the temperature deviation function, comprising:
   operating the image projection device to project the pixel on a display element using the initial spatial coordinate at the first temperature to form a first projected pixel;
   determining a first displayed spatial coordinate of the first projected pixel on the display element;
   operating the image projection device to project the pixel on the display element using the initial spatial coordinate at the second temperature to form a second projected pixel;
   determining a second displayed spatial coordinate of the second projected pixel on the display element;
   determining a deviation of the second displayed spatial coordinate from the first displayed spatial coordinate; and
   generating the temperature deviation function to describe an inverse of the deviation.

14. A system comprising:
a light source to generate a source light;
a spatial modulator to receive the source light from the light source;
a display element to receive the source light from the spatial modulator and direct the source light towards an eye of a viewer; and
a controller in communication with the light source and the spatial modulator, the controller to:
   obtain a set of spatial coordinates of a pixel of an image to be projected, the set of spatial coordinates comprising a first spatial coordinate corresponding to a first dimension and a second spatial coordinate corresponding to a second dimension;
   generate a first pre-warped spatial coordinate associated with the first spatial coordinate, the first pre-warped spatial coordinate calculated as a sum of:
      a value of a first warp path function at the first spatial coordinate; and
      a first delta selected based on the second spatial coordinate and a first initial spatial coordinate, the first initial spatial coordinate corresponding to the second dimension; and
   control the spatial modulator to project the pixel using the first pre-warped spatial coordinate.

15. The system of claim 14, wherein the controller is further to:
   obtain the first warp path function associated with the system, to obtain the first warp path function the controller is to:
      control the light source and the spatial modulator to project the pixel on the display element using the first spatial coordinate to form a projected pixel;
      determine a displayed spatial coordinate of the projected pixel on the display element;
      determine a deviation of the displayed spatial coordinate from the first spatial coordinate; and
      generate the first warp path function to describe an inverse of the deviation.

16. The system of claim 14, wherein the first warp path function comprises a piecewise polynomial.

17. The system of claim 14, wherein the first delta is a constant.

18. The system of claim 14, wherein the first delta comprises a corresponding function of the first spatial coordinate.

19. The system of claim 14, wherein the controller is further to:
   select the first warp path function based on one or more of:
      a wavelength of the source light to be used to project the pixel; and
      a temperature of the system.

20. The system of claim 14, wherein the controller is further to:
   generate a second pre-warped spatial coordinate associated with the second spatial coordinate, the second pre-warped spatial coordinate calculated as a corresponding sum of:
      a corresponding value of a second warp path function at the second spatial coordinate; and
      a second delta selected based on the first spatial coordinate and a second initial spatial coordinate, the second initial spatial coordinate corresponding to the first dimension; and
   control the spatial modulator to project the pixel using the first pre-warped spatial coordinate and the second pre-warped spatial coordinate.

* * * * *